(12) United States Patent
Agrawal et al.

(10) Patent No.: US 10,133,792 B2
(45) Date of Patent: Nov. 20, 2018

(54) TRACK RECONCILIATION FROM MULTIPLE DATA SOURCES

(71) Applicant: International Business Machines Corporation, Armonk, NY (US)

(72) Inventors: Dakshi Agrawal, Monsey, NY (US); Raghu K. Ganti, Elmsford, NY (US); Jeffrey J. Jonas, Las Vegas, NV (US); Mudhakar Srivatsa, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 496 days.

(21) Appl. No.: 14/742,875

(22) Filed: Jun. 18, 2015

(65) Prior Publication Data
US 2015/0286666 A1   Oct. 8, 2015

Related U.S. Application Data

(63) Continuation of application No. 14/672,510, filed on Mar. 30, 2015.
(Continued)

(51) Int. Cl.
*G06F 17/30* (2006.01)
*G01S 5/00* (2006.01)
(Continued)

(52) U.S. Cl.
CPC .......... *G06F 17/30551* (2013.01); *G01S 5/00* (2013.01); *G01S 5/0294* (2013.01); *G06K 9/00771* (2013.01); *H04W 64/00* (2013.01)

(58) Field of Classification Search
CPC .............. G06F 17/30551; H04W 64/00; G01S 5/0294; G01S 5/00; G06K 9/00771
(Continued)

(56) References Cited

U.S. PATENT DOCUMENTS

| | | | | |
|---|---|---|---|---|
| 6,697,103 | B1 * | 2/2004 | Fernandez | G08B 13/19608 348/143 |
| 2003/0063072 | A1 * | 4/2003 | Brandenberg | G06F 17/30867 707/E17.109 |

(Continued)

OTHER PUBLICATIONS

Dakshi Agrawal, et al.,"Track Recociliation From Multiple Data Sources," U.S. Appl. No. 14/672,510, filed Mar. 30, 2015.
(Continued)

*Primary Examiner* — Vincent F Boccio
(74) *Attorney, Agent, or Firm* — Cantor Colburn LLP (57) ABSTRACT

Embodiments relate to reconciling different entity identifiers. A method of reconciling different entity identifiers of a same entity is provided. The method receives a plurality of series of location-time data items from a plurality of tracking systems that each track one or more entities. Each series of location-time data items is associated with an entity identifier. The method categorizes each location-data item into a space-time region. The method generates a track for each of the plurality of series of location-time data items based on the space-time regions into which the location-data items are categorized, and generates a track signature for each of the generated tracks based on a segment of the generated track. The method compares the track signatures to find matching track signatures. Based on a plurality of matching signatures, the method reconciles the plurality of entity identifiers associated with the plurality of matching signatures to a particular entity.

5 Claims, 4 Drawing Sheets

Related U.S. Application Data (60) Provisional application No. 61/972,747, filed on Mar. 31, 2014.

(51) Int. Cl.
*H04W 64/00* (2009.01)
*G01S 5/02* (2010.01)
*G06K 9/00* (2006.01)

(58) Field of Classification Search
USPC .......................................................... 707/746
See application file for complete search history.

(56) References Cited

U.S. PATENT DOCUMENTS

| | | | | |
|---|---|---|---|---|
| 2010/0076968 | A1* | 3/2010 | Boyns | G06F 17/30241 707/732 |
| 2011/0258049 | A1* | 10/2011 | Ramer | G06F 17/30867 705/14.66 |
| 2012/0226889 | A1* | 9/2012 | Merriman | G06F 17/30333 711/216 |
| 2013/0288647 | A1* | 10/2013 | Turgeman | H04W 12/06 455/411 |
| 2014/0351044 | A1* | 11/2014 | Rahman | G06Q 30/0261 705/14.53 |
| 2015/0121544 | A1* | 4/2015 | He | G06F 21/31 726/27 |
| 2015/0260849 | A1* | 9/2015 | Eastman | G01S 19/19 701/482 |
| 2015/0261945 | A1* | 9/2015 | Johansson | G06F 21/316 726/7 |

OTHER PUBLICATIONS

List of IBM Patents or Patent Applications Treated as Related; YOR920131038US3, Date File: Jun. 18, 2015, pp. 1-2.

* cited by examiner

TRACK RECONCILIATION FROM MULTIPLE DATA SOURCES

DOMESTIC PRIORITY

This application is a continuation of U.S. patent application Ser. No. 14/672,510, filed Mar. 30, 2015, which claims priority to U.S. Provisional Application No. 61/972,747, entitled "TRACK RECONCILIATION FROM MULTIPLE DATA SOURCES," filed Mar. 31, 2014, which is incorporated herein by reference in its entirety.

BACKGROUND

The present disclosure relates generally to tracking of entities using sensors, and more specifically, to a system for reconciling tracks generated by different data sources yet corresponding to the same entity.

Various mechanisms can be used to track movement of persons, vehicles, vessels, airplanes, asteroids and other entities. Examples of passive tracking mechanisms include detection with a series of video cameras, triangulation using cell towers or wireless access points, radar detection, heat detection, and telescopes. Examples of active tracking mechanisms include a global positioning system (GPS) transceiver, a radio-frequency identification (RFID) tag.

Tracking sensors using a variety of tracking mechanisms generate tracking data, typically in the form of a series of space and time data pairs for the entities being tracked. Conventional tracking systems analyze the tracking data in order to get some useful information out of the data. However, analyzing the tracking data is often computationally expensive.

SUMMARY

Embodiments include a computer program product, a method, and a system for generating a route plan. According to an embodiment of the present invention, a computer program product for generating a route plan is provided. The computer program product comprises a computer readable storage medium having program instructions embodied therewith. The program instructions readable by a processing circuit cause the processing circuit to perform a method. The method receives a plurality of series of location-time data items from a plurality of tracking systems that each track one or more entities. Each series of location-time data items is associated with an entity identifier. The method categorizes each location-data item into a space-time region. The method generates a track for each of the plurality of series of location-time data items based on the space-time regions into which the location-data items are categorized. The method generates a track signature for each of the generated tracks based on a segment of the generated track. The method compares the track signatures to find matching track signatures. Based on a plurality of matching signatures, the method reconciles the plurality of entity identifiers associated with the plurality of matching signatures to a particular entity.

According to another embodiment of the present invention, a computer system for reconciling different entity identifiers of a same entity is provided. The computer system comprises a memory having computer readable instructions and a processor configured to execute the computer readable instructions. The instructions comprise receiving a plurality of series of location-time data items from a plurality of tracking systems that each track one or more entities. Each series of location-time data items is associated with an entity identifier. The instructions further comprise categorizing each location-data item into a space-time region. The instructions further comprise generating a track for each of the plurality of series of location-time data items based on the space-time regions into which the location-data items are categorized. The instructions further comprise generating a track signature for each of the generated tracks based on a segment of the generated track. The instructions further comprise comparing the track signatures to find matching track signatures. The instructions further comprise, based on a plurality of matching signatures, reconciling the plurality of entity identifiers associated with the plurality of matching signatures to a particular entity.

According to a further embodiment of the present invention, a method of reconciling different entity identifiers of a same entity is provided. The method receives a plurality of series of location-time data items from a plurality of tracking systems that each track one or more entities. Each series of location-time data items is associated with an entity identifier. The method categorizes each location-data item into a space-time region. The method generates a track for each of the plurality of series of location-time data items based on the space-time regions into which the location-data items are categorized. The method generates a track signature for each of the generated tracks based on a segment of the generated track. The method compares the track signatures to find matching track signatures. Based on a plurality of matching signatures, the method reconciles the plurality of entity identifiers associated with the plurality of matching signatures to a particular entity.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

When multiple sources of tracking data are used to track a particular entity, each source may assign a different identifier to the entity. For example, a casino might use video cameras to track faces of people moving through the casino, assigning an identifier to each face. The casino might also use the identifier of a wireless device carried by casino patrons to track the patron as the device moves from one wireless access point to the other.

In such a scenario, the same person generates two sets of tracks, each with a different identifier. However, without information about the correspondence between the two identifiers, the tracking system is unable to recognize that two tracks belong to the same person. Some systems do have prior knowledge of the patron identifiers, for example, a database of casino patrons from previous visits, and such systems can use this knowledge to recognize when two tracks belong to the same patron. However, other systems learn patron identifiers on-the-fly. Conventional systems that dynamically learn the identifiers for tracked entities are unable to reconcile two tracks generated by the same entity.

Embodiments described herein are directed to methods, systems and computer program products that reconcile two or more tracks for a same entity that is tracked by two or more sources of tracking data. A tracking reconciliation system of exemplary embodiments receives tracking data from two or more sources. The tracking data from each source for each particular entity being tracked is typically a stream of location-time data items associated with an identifier of the particular entity assigned by the source. The tracking reconciliation system processes each stream of location-time data items for the particular entity to generate a track signature. The track signatures facilitate a fast comparison of different tracking data from different sources. The tracking reconciliation system reconciles different identifiers of an entity by comparing the track signatures. That is, when a match between a track signature for a track for one source of tracking data and a track signature for another track for another source of tracking data, the tracking reconciliation system reconciles the entity identifiers associated with the tracks to the same entity.

Figure 1:
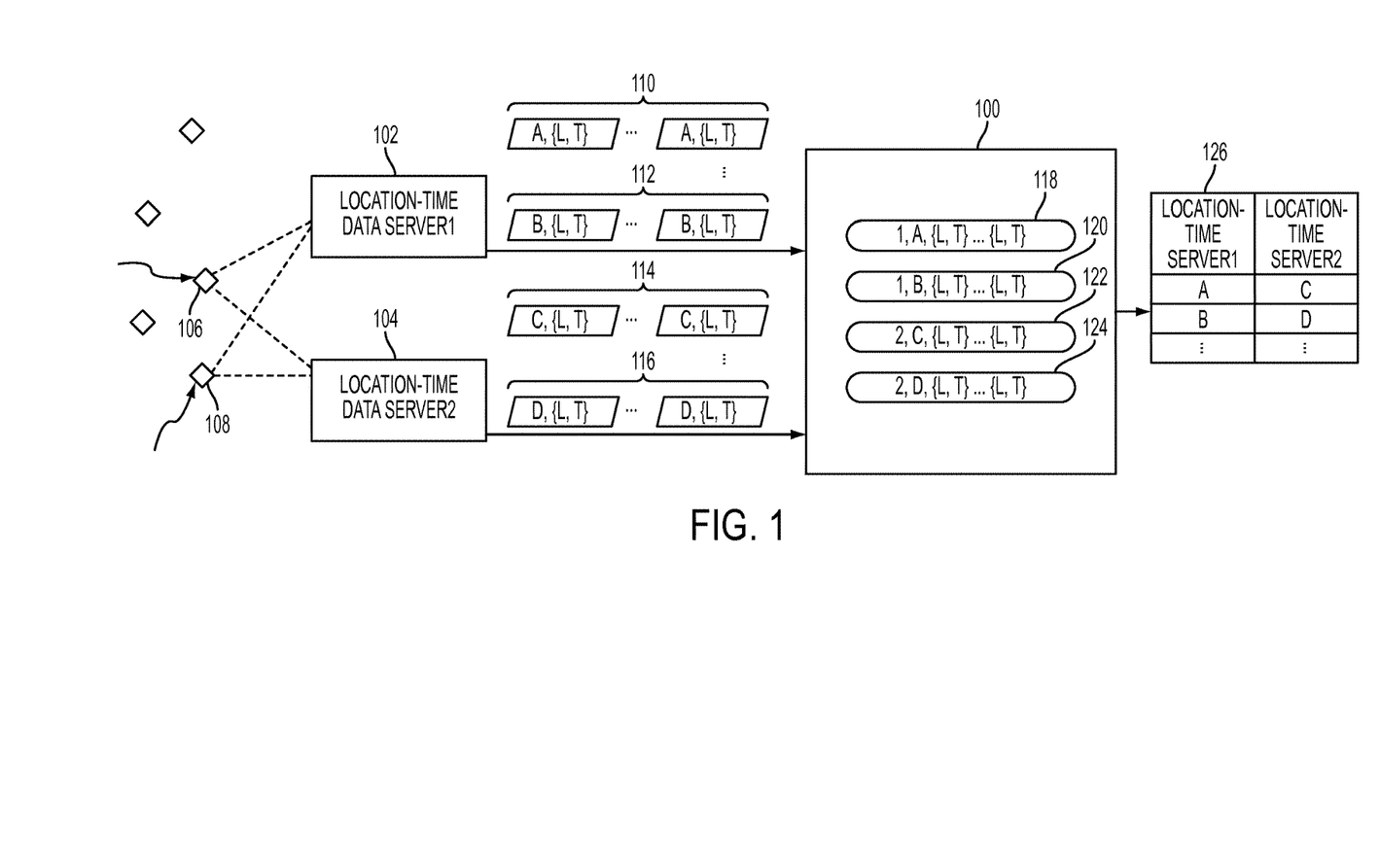
FIG. 1 depicts a tracking reconciliation system and an environment in which the tracking reconciliation system operates according to an embodiment.

FIG. 1 depicts a tracking reconciliation system 100 and an environment in which the tracking reconciliation system 100 operates, according to an embodiment disclosed herein. The environment may have two or more location-time data servers including a first location-time data server 102 and a second location-time data server 104. Each location-time data server provides a stream of data describing the location of a tracked entity, along with the time that the location was determined. The location-time servers may utilize any of a variety of technologies to obtain location information. For example, the first location-time data server 102 may use cellular radio towers to triangulate the position of mobile phones while the second location-time data server 102 uses wireless local area network (WLAN) access points to triangulate the position devices that have a WLAN transceiver (e.g., a notebook computer, a tablet computer, or a mobile phone).

In an embodiment, the tracking reconciliation system 100 assumes that these devices are carried by, or are collocated with, individuals, so that obtaining a device position by triangulation also obtains the position of a person associated with the device. While in an embodiment the location-time data servers 102 and 104 track position using triangulation of signals transmitted by devices, the location-time data servers 102 and 104 in other embodiments use position tracking technologies that recognize a particular individual, for example, facial and/or body recognition using video cameras or speech recognition using microphones. Thus, the tracking reconciliation system 100 tracks entities, which may include persons, devices, vehicles, etc.

As an entity moves, the location-time data servers 102 and 104 track that entity and each server provides a series of location-time data items for the entity to the tracking reconciliation system 100. Each tracked entity is assigned an identifier by each location-time data server. A location-time data series is thus associated with a particular location-time data server and with a particular entity. In some cases, however, more than one location-time data series may be generated for the same entity by the same location-time data server. This is because the same location-time data server may not be able to reconcile the same entity in different time intervals. An example of such cases is when a system using a face detection technique tracks persons coming in and out of a region. When a particular person is in the region the location-time data series generated for the particular person is assigned to a first entity identifier. However, the particular person exits and then reenters the region, the system is not capable of recognizing the person (due to the limitation by the facial detection technique) and thus assigns a second entity identifier to the location-time data series generated from then on until the particular person exits the region again.

FIG. 1 illustrates movement by two entities 106 and 108 tracked by the data servers 102 and 104. Although the location-time data servers 102 and 104 view the two entities as four different entities, the tracking reconciliation system 100 determines whether some of these entities may actually be the same entity, using techniques explained in further detail below. In FIG. 1, the location-time data server 102 generates location-time data items 110 corresponding to the entity 106, and generates location-time data items 112 corresponding to the entity 108. The location-time data server 104 generates location-time data items 114 corresponding to the entity 106, and generates location-time data items 116 corresponding to the entity 108.

The tracking reconciliation system 100 uses the received location-time data items for a particular entity to build and maintain a set of candidate tracks taken by the entity. These tracks are merely "candidates" due to different levels of precision in the location and/or timestamp data. The ramifications of the different levels of precision will be discussed in more detail further below by reference to FIG. 2. As described above, each location-time data item is associated with an entity identifier and the location-time data server 110 that generated the location-time data item. The tracking reconciliation system 100 also associates each candidate track with an entity identifier and a location-time data server. FIG. 1 illustrates four candidate tracks 118-224, one for each entity identifier. The tracking reconciliation system 100 updates candidate tracks 170 as additional location-time data items are received.

As noted above, each location-time data server assigns identifiers to the entities being tracked. However, the location-time data servers often do not coordinate when assigning entity identifiers. Therefore, the identifier assigned to a particular entity by the first location-time data server 102 is independent of the identifier assigned to the same entity by the second location-time data server 104. The tracking reconciliation system 100 operates to discover a mapping 126 between entity identifiers used by different location-time data servers, as will now be described below by reference to FIG. 2.

Figure 2:
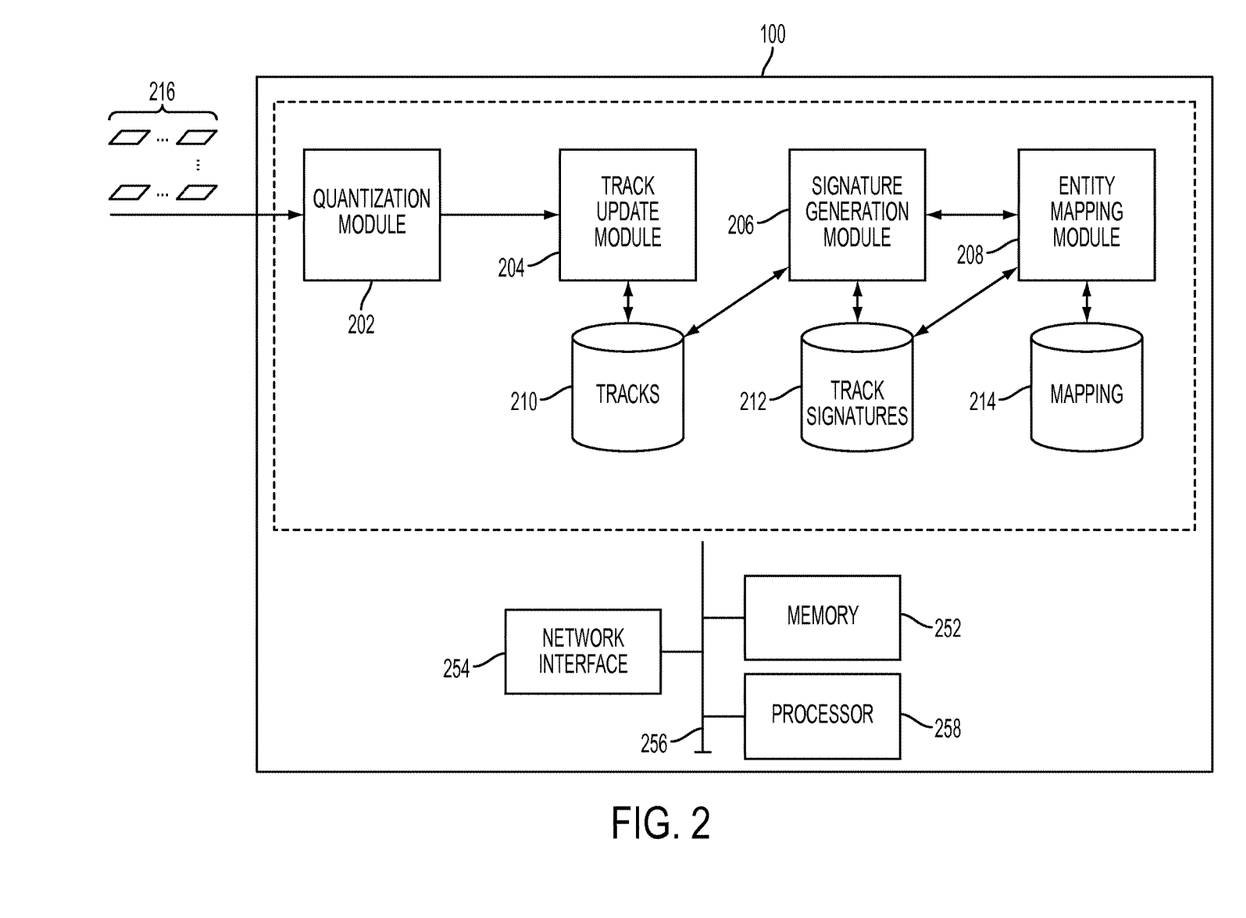
FIG. 2 depicts a block diagram of the tracking reconciliation system according to an embodiment.

FIG. 2 depicts a block diagram of the tracking reconciliation system 100. In an embodiment, the tracking reconciliation system 100 includes a quantization module 202, a track update module 204, a signature generation module 206, and an entity mapping module 208. The quantization module 202 and the track update module 204 together generate candidate tracks 210 based on location-time data items received from the location-time data servers (not shown). In an embodiment, a candidate track includes a series of space-time regions to which the location-time data items belong. A space-time region is a spatial region associated with a time interval. A location-time data item is determined to belong to a particular space-time region when the location specified in the location-time data item falls within the spatial region and the time specified in the location-time data item falls within the time interval. Upon receiving a location-time data item from a location-time data server, the quantization module 202 identifies a space-time region to which the location-time data item belongs. The track update module 204 adds the identified space-time region to the candidate track for the entity identifier of the location-time data item. In this manner, the track update module 204 creates and maintains candidate tracks for different entity identifiers.

More specifically, the quantization module 202 receives location-time data items 216 from different location-time data servers. Because the location-time data items are received in a stream, the location-time information, as received, exists in the continuous domain in some cases. The quantization module 202 transforms this to the discrete domain by quantizing location-time data items. In an embodiment, the quantization module 202 classifies a location-time data item into at least one space-time region that contains the location and time specified in the location-time data item. The output of quantization module 202 is thus one or more space-time regions corresponding to a received location-time data item.

As mentioned above, a space-time region is a spatial region associated with a time instance. In an embodiment, the spatial region of the space-time region may be in two- or three-dimension, corresponding to the dimension of the location information specified in an input location-time data item. The size and shape of the spatial region is configurable to one of a number of predefined sizes and one of a number of predefined two- or three-dimensional shapes. The length of the time interval is also configurable. In an embodiment, the quantization module 202 may configure the spatial region and the time interval of a space-time region based on the sizes and the velocities of an entity being tracked. For example, if ships are being tracked, the spatial region of a space-time region may be configured to a square with a side of several kilometers and the time interval would span tens of minutes. As another example, if asteroids are being tracked, the spatial region of a space-time region may be configured to a cube with a side of several thousand kilometers and the time interval would span several hours.

In an embodiment, the spatial region of a space-time region is represented by a single set of coordinate values for a location within the spatial region. For example, the coordinates of the center location of the spatial region configured to a square may represent the space-time region. Likewise, the time interval of the space-time region is represented by a time instance that falls in the time interval of the space-time region. For example, the middle instance of the time interval may represent the time interval. In an embodiment, when the quantization module 202 quantizes an input location-time data item, the output of this quantization process is a location-time pair that represents the spatial region and the time interval of a space-time region to which the input location-time data item belongs.

In an embodiment, the quantization module 202 uses a variation of Geohash technique when configuring a two-dimensional spatial region of a space-time region. The Geohash technique provides arbitrary precision and the possibility of gradually removing characters from the end of the code with a gradual loss of precision. As known, a conventional Geohash uses 5-bit characters, which results in a step size that increases by a factor of 4 or 8 and therefore a coarse grid. In an embodiment, the quantization module 202 uses a variation of the Geohash technique with a single bit character. Single bit characters produce a step size that increases by a factor of 2 at each step, resulting in a finer grid.

In an embodiment, the quantization module 202 quantizes an input location-time data item into space-time regions configured to different spatial and temporal densities or resolutions. In such an embodiment, the quantization module 202 uses space-time regions of different sizes and different time interval lengths, and then classifies the location-time data item using each of those different space-time regions. Thus, in such an embodiment, the output of the quantization module 202 by quantizing a single location-time data item may be as many space time regions as the number of different densities or resolutions that the quantization module 202 uses.

In an embodiment, the quantization module 202 may generate more than one space-time regions even at a single density because of different levels of precision that an input location-data item has. In some cases, the location information specified in the input location-data item identifies a relatively precise location (e.g., GPS coordinate values) of the entity being tracked. However, in other cases, the location information specified in the input location-data item identifies a relatively imprecise location (e.g., an ellipse resulting from cell-tower triangulation). In such cases, the location specified by the input location-time data may belong to more than one space-time regions at the same time. In such cases, the output of quantizing a single location-time data item by the quantization module 202 may be all the space-time regions to which the location-time data item belongs.

The track update module 204 generates one or more candidate tracks for each series of location-time data items based on the output space-time regions outputted by the quantization module 202. The track update module 204 creates a candidate track if one does not exist for an entity identifier. Otherwise, the track update module 204 extends the candidate track for an entity identifier to include the most recent space-time region generated by the quantization module 202. In an embodiment, the track update module 204 adds an output space-time region only to those tracks that are compatible with the space-time region in terms of location-time data source, entity identifier, density, etc. In an embodiment, the track update module 204 verifies that a space-time region is not already the most recent point in the track before adding. The track update module 204 discards stale tracks that have not been updated recently (e.g., within the last 10 minutes, 60 minutes, or other predefined duration). In an embodiment, the track update module 204 may store candidate tracks by encoding the tracks into a compact form, for example, as sets of plausible locations at difference snapshots in time. The candidate tracks can then be regenerated by a time-ordered cross-product of these sets.

Figure 3:
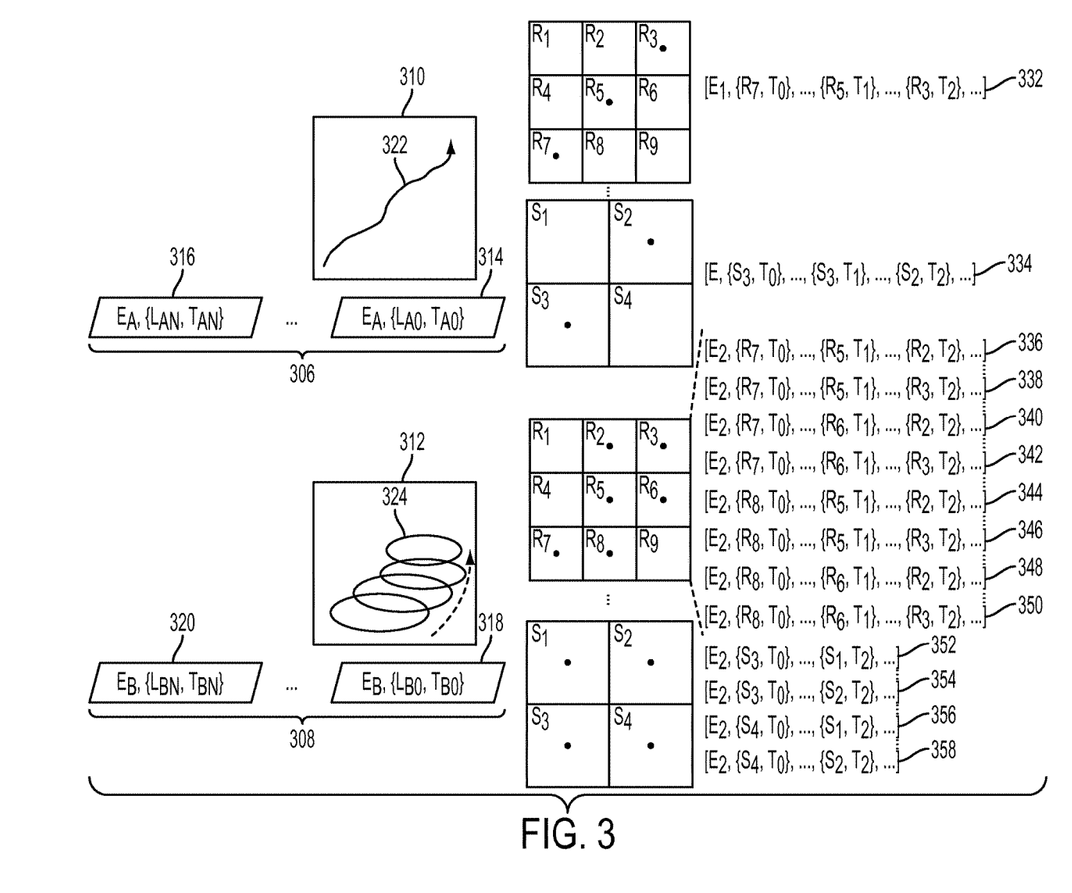
FIG. 3 illustrates an example of quantizing two separate series of location-time data items and generating candidate tracks from the two series according to an embodiment.

FIG. 3 illustrates an example of quantizing two separate series of location-time data items and generating candidate tracks from the two series. Specifically, FIG. 3 shows two series of location-time data items 306 and 308. In this example, the series 306 is from a location-time data server that is capable of identifying the locations of an entity in a relatively higher precision (e.g., GPS coordinates) while the series 308 is from another location-time data server that is capable of identifying the locations of an entity in a relatively lower precision (e.g., ellipses resulting from cell-tower triangulation).

The series 306 includes location-time data items 314 through 316. As shown, the location-time data item 314 includes an entity identifier depicted as $E_A$, location information depicted as $L_{A0}$, and time stamp depicted as $T_{A0}$. $E_A$ is an entity identifier assigned to the series 306 by the location-time data server that generated the series 306. $L_{A0}$ is location information, which, in this example, includes GPS coordinates of a particular location of the entity with the entity identifier. $T_{A0}$ is a value that represents a time instance when the entity was at the particular location. Likewise, the location-time data item 316 includes an entity identifier depicted as $E_A$ (because the location-time data item 316 is in the same series 306 as the location-time data item 314), location information depicted as $L_{AN}$, and a time stamp depicted as $T_{AN}$. The series 306 includes as many location-time data items as the number of the time instances between $T_{A0}$ and $T_{AN}$, although only the data items 314 and 316 are depicted. The number of the time instances between $T_{A0}$ and $T_{AN}$ depends on how often (e.g., every 10 milliseconds, every second, every minute, etc.) the location-time data server samples the location of the entity being tracked. For illustrative purposes, the series 306 is plotted as an arrowed curve 322 in a two-dimensional region 310. Each point along the curve 322 represents a location of the entity being tracked at a particular time instance between $T_{A0}$ and $T_{AN}$.

The series 308 includes location-time data items 318 through 320. As shown, the location-time data item 314 includes an entity identifier depicted as $E_B$, location information depicted as $L_{B0}$, and time stamp depicted as $T_{B0}$. $E_B$ is an entity identifier assigned to the series 308 by the location-time data server that generated the series 308. $L_{B0}$ is location information, which, in this example, includes a set of coordinate values for a set of locations in an ellipse in which the entity with the entity identifier may be located at a time instance depicted as $T_{B0}$. Likewise, the location-time data item 320 includes an entity identifier depicted as $E_B$ (because the location-time data item 320 is in the same series 308 as the location-time data item 318), location information depicted as $L_{BN}$, and a time stamp depicted as $T_{BN}$. The series 308 includes as many location-time data items as the number of the time instances between $T_{B0}$ and $T_{BN}$, although only the data items 314 and 316 are depicted. The number of the time instances between $T_{B0}$ and $T_{BN}$ depends on how often (e.g., every 10 milliseconds, every second, every minute, etc.) the location-time data server samples the location of the entity being tracked. For illustrative purposes, the series 308 is plotted as a set of ellipses 324 in a two-dimensional region 312. Each of the ellipses represents a set of locations at which the entity being tracked may be at a particular time instance between $T_{B0}$ and $T_{BN}$. In this example, a time period between $T_{A0}$ and $T_{AN}$ and a time period between $T_{B0}$ and $T_{BN}$ are identical.

As mentioned above, in an embodiment, the quantization module 202 quantizes an input location-time data item into space time regions configured to different spatial and temporal densities or resolutions. In the example of FIG. 3, the quantization module 202 (not shown) uses space time regions defined at two different spatial densities and at the same temporal density. As shown, two two-dimensional regions 324 and 326 are each partitioned into nine spatial regions. In this example, the regions 324 and 326 are the same geographical region, and hence the nine spatial regions in each of the regions 324 and 326 are identified by the same indexes, $R_1$ though $R_9$. Two two-dimensional regions 328 and 330 are the same geographical region as the regions 324 and 326, but are each partitioned into four spatial regions, identified with the indexes, $S_1$ though $S_4$.

In the example of FIG. 3, each of the spatial regions is represented by the spatial region's midpoint (e.g., average coordinate values of the coordinate values within the spatial region). The quantization module 202 (not shown) quantizes the location-time data items in the series 306 and 308 using the partitioned regions 324 and 328. The quantization module 202 also uses time intervals of the same length for quantizing the location-time data items in the series 306 and 308. The time intervals are represented by time instances $T_0$ through $T_N$, with $T_0$ representing the first time interval and $T_N$ represents the most recent time interval.

Quantizing the location-time data item 314 of the series 306 using the region 324 results in a space time region that has the spatial region $R_7$ and a time interval represented by $T_0$ because location $L_{A0}$ falls in the spatial region $R_7$ and $T_{A0}$ falls in the time interval. The track update module creates and updates a track 332 with this space time region, which is depicted as $\{R_7, T_0\}$ in the track 332. Quantizing the next location-time data item (not shown) of the series 306 would result in a space time region that has the spatial region $R_7$ and a time interval represented by $T_0$ if the location $L_{A1}$ falls in the spatial region $R_7$ and $T_{A1}$ falls in the time interval represented by $T_0$. The track update module 204 would add the resulting space time region $\{R_7, T_0\}$ to the track 332, and the first two space time regions in the track 332 would be identical. The track 322 keeps getting updated as the quantization module 320 quantizes incoming location-time data items and the track update module 204 adds the resulting space time regions to the track 322.

As can be recognized, two different space time regions may differ in spatial regions only or in time intervals only. For instance, when two location-time data items with two different locations of an entity at two different instances are quantized, the two resulting space time regions may have two different spatial regions and the same time interval if the entity is fast enough to move from one spatial region to another in a short span of time that falls in the same time interval. Likewise, the two resulting space time regions may have the same spatial region and two different time intervals if the entity is slow enough to move (or not move) within the same spatial region in a long span of time that falls in the two different time intervals.

Quantizing the location-time data items of the series 306 using the region 328 results in the space time regions shown in the track 334. Because the region 328 is partitioned into four spatial regions $S_1$ though $S_4$, each of the spatial regions $S_1$ though $S_4$ is bigger than each of the spatial regions $R_1$ though $R_9$. Therefore, more of the space time regions in the track 334 have the same spatial regions than the space time regions in the track 332 do.

Quantizing the first location-time data item 318 of the series 308 using the region 326 results in two space time regions that have the spatial regions $R_7$ and $R_8$ and a time interval represented by $T_0$ because locations $L_{B0}$, being in an ellipse, fall in the two spatial regions $R_7$ and $R_7$ at the same time instance $T_{B0}$ that falls in the time interval. The track update module 204 creates and updates two tracks 336 and 344 with the two space time regions, which are depicted as $\{R_7, T_0\}$ in the track 332 and $\{R_8, T_0\}$ in the track 344, respectively.

Quantizing the next location-time data item (not shown) of the series 308 would result in two space time regions that has the spatial region $R_7$ and $R_8$ and a time interval represented by $T_{A1}$ if the locations $L_{B1}$ fall in the spatial regions $R_7$ and $R_7$ at the same time instance $T_{B1}$ that falls in the time interval represented by $T_0$. In an embodiment, the track update module 204 would add the resulting space time regions $\{R_7, T_0\}$ and $\{R_8, T_0\}$ to the tracks 336 and 344, respectively. The track update module 204 would not create new tracks at this point because the space time regions $\{R_7,$ $T_0\}$ and $\{R_8, T_0\}$ resulted from quantizing the second location-time data item are not different from the existing space time regions $\{R_7, T_0\}$ and $\{R_8, T_0\}$ resulted from quantizing the first location-time data item 318. However, in another embodiment, whenever the quantization module 202 produces two or more different space time regions from quantizing one location-time data item for an entity identifier, the track update module 204 creates new tracks. Therefore, in such an embodiment, the track update module 204 would create two new tracks (not shown) at this point. The first two space time regions of the four tracks may be depicted as $\{R_7, T_0\}$, $\{R_7, T_0\}$; $\{R_7, T_0\}$, $\{R_8, T_0\}$; $\{R_8, T_0\}$, $\{R_7, T_0\}$; and $\{R_8, T_0\}$, $\{R_8, T_0\}$. As the quantization module 202 receives and processes the subsequent location-time data items of the series 308, the track update module 204 in this example creates more tracks. Only the tracks 336-350 are shown in FIG. 3.

Quantizing each of the location-time data items of the series 308 using the region 330 results in two or more different space time regions. Therefore, the track updater module 204 creates and maintains many tracks 352 through 368.

Referring back to FIG. 2, the signature generation module 206 generates track signatures 212 for the candidate tracks 210 maintained by the track update module 204. A track signature represents a sequence of space-time regions (i.e., a segment) of a candidate track and can be used to compare two or more candidate tracks to determine whether the tracks belong to the same entity. A match on the track signature indicates that the tracks probably belong to the same entity, even though different location-time data servers have assigned different entity identifiers to that entity. In general, a track signature is likely to identify a candidate track uniquely if a relatively long sequence of space-time regions is used to generate the track signature. That is, the longer the sequence of space-time regions is, the higher the chance of matching one signature for a sequence of space-time regions for a first location-time data server to only one signature for a sequence of space-time regions for a second location-time server. In an embodiment, the signature generation module 206 generates more than one signature for a candidate track for an entity identifier. This is because the signature generation module 206 does not use an entire candidate track (i.e., the entire sequence of space-time regions in the track) to generate a signature.

As mentioned above, a space-time region of a track includes a spatial region and a time interval, and the spatial region and the time interval are represented by a location and a time instance. Therefore, a space-time region of a track signature includes a spatial region and a time interval, too. In an embodiment, the signature generation module 206 uses a locality-sensitive hashing technique to encode the location that represents the spatial region of a space-time region so that location specified in different precision levels can be directly compared. A locality-sensitive hashing technique allows two or more locations close to each other to have a similar hash value.

The entity mapping module 208 determines whether two or more entity identifiers refer to the same entity by comparing the track signatures that are associated with the entity identifiers. As mentioned above, a match on the signatures indicates that the tracks probably belong to the same entity. Based on the matches between different track signatures, the entity mapping module 208 generates a mapping 214 between different entity identifiers assigned by different location-time data servers. The entity mapping in turn allows information from different location-time data servers to be combined, or fused, to draw new inferences.

In an embodiment, the signature generation module 206 generates short track signatures. A short track signature is generated from a relatively short sequence of space-time regions (i.e., a short segment) of a candidate track. Therefore, the same short signature is likely to match more than one short signatures for more than one track. In an embodiment, the entity mapping module 208 compares short track signatures to reconcile entity identifiers by distinguishing between groups or classes of entities rather than by distinguishing between individual entities.

Specifically, in an embodiment, the entity mapping module 208 initially puts all entity identifiers in one class. As more space-time regions for different entity identifiers are supplied to the signature generation module 206, the signature generation module 206 generates short track signatures. The entity mapping module 208 compares these short signatures to partition the class into smaller classes of entity identifiers. The smaller classes are further partitioned as the subsequent space-time regions for different tracks for the different identifiers are updated by the track update module 204. As the entity mapping module 208 iteratively partitions a class into smaller classes, an invariant is that all entity identifiers in a class are reconcilable. The entity mapping module 208 stops partitioning a class when the class has a threshold number (e.g., two when there are two sources of location-time data items, or three when there are three sources of location-time data items) of the entity identifiers remaining in the class. At that point, the entity mapping module 208 reconcile the entity identifiers remaining in the class by concluding that these entity identifiers are of the same entity.

In an embodiment, the entity mapping module 208 backtracks when a partitioned class has less than the threshold number of entity identifiers remaining in the class. Specifically, the entity mapping module 208 directs the signature generation module 206 to generate shorter track signatures based on the most recent space-time regions generated so that more entity identifiers remain in a class.

The class-partitioning technique using short track signatures may be used beyond reconciling different entity identifiers. For example, the technique may be applied to the analysis of traffic patterns to identify a class or a group of vehicles that share the same route.

As used herein, the terms module and sub-module may refer to an application specific integrated circuit, an electronic circuit, a processor (shared, dedicated, or group) and memory that executes one or more software or firmware programs, or a combinational logic circuit in a system. For example, in an embodiment, the modules 202-208 may be communicatively connected (e.g., through a bus 256) to a memory 252 to store and retrieve data such as the tracks 210, the track signatures 212, and the mapping 214, and to a network interface 254 to exchange data with the location-time data servers. The modules 202-208 may also be use a processor 258 to perform their operations. In an embodiment, the modules 202-208 may be combined or further partitioned. Also, the modules 202-208 may be implemented in more than one server in a distributed fashion. That is, the tracking reconciliation system 100 may be implemented in more than one server in a distributed fashion.

Figure 4:
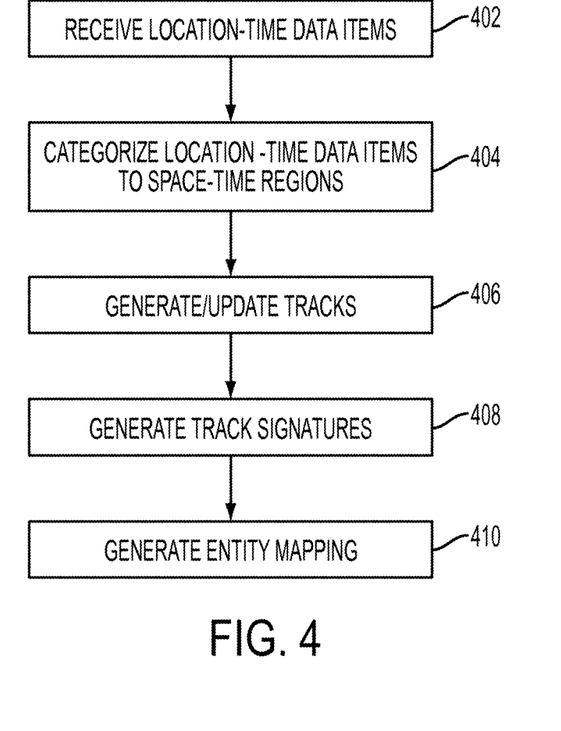
FIG. 4 depicts a process flow for reconciling different entity identifiers of the same entity tracked by two or more location-time data servers according to an embodiment.

FIG. 4 depicts a process flow for reconciling different entity identifiers of the same entity tracked by two or more location-time data servers. In an embodiment, the process shown in FIG. 4 is performed by the tracking reconciliation system 100. At block 402, the tracking reconciliation system 100 receives several different streams of location-time data items from each of several different sources that track several different entities. As mentioned above, a different entity identifier is assigned to each stream of location-time data items.

At block 404, the tracking reconciliation system 100 quantizes the location-time data items received from the different location-time data servers into space-time regions. Specifically, upon receiving a location-time data item from a location-time data server, the tracking reconciliation system 100 identifies a space-time region to which the location-time data item belongs. As mentioned above, a space-time region includes a spatial region and a time interval associated with the spatial region, and the space-time region and the time interval are represented by a location and a time instance, respectively. Therefore, the location information and the time information of any location-time data item that belongs to a space-time region is quantized to the location and the time instance that represent the spatial region and the time interval of the space-time region. Also as mentioned above, a location-time data item may belong to more than one space-time region depending on the level of prevision that the location information of the location-time data item includes.

At block 406, the tracking reconciliation system 100 generates and updates at least one candidate track for each stream of location-time data items associated with an entity identifier based on the space-time regions to which the stream of location-time data items are quantized. Specifically, the tracking reconciliation system 100 adds each space-time region to a candidate track for the same entity identifier so that each entity identifier is associated with a track. When a location-time data item for an entity identifier belongs to more than one space-time region, the tracking reconciliation system 100 may create new candidate tracks for the entity identifier. In an embodiment, the tracking reconciliation system 100 generates and updates multiple candidate tracks at different densities or resolutions, for each stream of location-time data items.

At block 408, the tracking reconciliation system 100 generates track signatures for the candidate tracks generated at block 406. The tracking reconciliation system 100 generates track signatures of different lengths based on the manner in which the tracking reconciliation system 100 reconciles different entity identifiers. Specifically, the track reconciliation system 100 generates track signatures based on sequences of space-time regions with sufficiently long lengths so that a track signature for an entity identifier for one location-data server is likely to match a relatively small number of track signatures for another location-data server. The track reconciliation system 100 generates track signatures based on sequences of space-time regions with sufficiently short lengths so that a track signature for an entity identifier for one location-data server is likely to match a relatively large number of track signatures for another location-data server.

At block 410, the tracking reconciliation system 100 generates mapping between different entities identifiers from different location-time data servers. Specifically, in one embodiment, the tracking reconciliation system 100 compares the long track signatures to find a match between different tracks from different location-time data servers. When a match is found, the tracking reconciliation system 100 reconciles the entity identifiers assigned to the matched long signatures by concluding that these entity identifiers are for the same entity.

In another embodiment, the tracking reconciliation system 100 initially puts all entity identifiers in one class. As more space-time regions for different entity identifiers are generated, the short track signatures are also generated. The tracking reconciliation system 100 compares these short signatures to partition the class into smaller classes of entity identifiers. The smaller classes are further partitioned as the subsequent space-time regions for different tracks for the different identifiers are updated. The tracking reconciliation system 100 stops partitioning a class when the class has a threshold number (e.g., two when there are two sources of location-time data items, or three when there are three sources of location-time data items) of the entity identifiers remaining in the class. At that point, the tracking reconciliation system 100 reconciles the entity identifiers remaining in the class by concluding that these entity identifiers are of the same entity.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method of reconciling different entity identifiers of a same entity, the method comprising:
   receiving, by a processor, a plurality of series of location-time data items from a plurality of tracking systems that each track one or more entities, each series of location-time data items associated with an entity identifier;
   categorizing each location-data item into a space-time region;
   generating a track for each of the plurality of series of location-time data items based on the space-time regions into which the location-data items are categorized;
   generating a track signature for each of the generated tracks based on a segment of the generated track;
   comparing the track signatures to find matching track signatures;
   based on a plurality of matching signatures, reconciling the plurality of entity identifiers to a same entity; and
   responsive to determining a threshold number of tracks, generating a track signature for each of the generated tracks based on a shorter segment of the generated track, wherein the shorter segment is a different size than the segment of the generated track.

2. The method of claim 1 further comprising:
   identifying a group of tracks that have a same track signature;
   reducing a size of the group using a subsequent track signature generated from the tracks in the group by removing those tracks in the group that do not have the subsequent track signature;
   repeating the reducing the size of the group until the size of the group drops down to a threshold number of tracks; and
   reconciling the entity identifiers associated with the tracks remaining in the group to a particular entity.

3. The method of claim 2, wherein generating the track signature for each of the generated track based on the shorter segment of the generated track such that more tracks have a same track signature is generated responsive to determining that the size of the group drops below the threshold number of tracks.

4. The method of claim 1, wherein a space-time region includes location information and a time interval, and the location information and the time interval is represented by a location and a time instance, respectively, wherein the categorizing each location-data item comprises quantizing a location and a time instance of a location-time data item into the location and the time instance for the space-time region, respectively.

5. The method of claim 1, wherein a space-time region includes location information and a time interval, wherein the generating a track signature comprises hashing the location information of each space-time region into a hash value using a locality-sensitive hashing technique.

* * * * *